US006132836A

United States Patent [19]

Quinif

[11] Patent Number: 6,132,836

[45] Date of Patent: Oct. 17, 2000

[54] CORRUGATED STRUCTURAL PAPER FILLERS FOR THE INTERIOR AREAS OF HOLLOW DOORS AND THE METHOD OF MAKING SAME

[76] Inventor: Edward G. Quinif, 6237 Sage Dr., Scottsdale, Ariz. 85253

[21] Appl. No.: 08/819,124

[22] Filed: Mar. 17, 1997

[51] Int. Cl.$^{7}$ .............. B32B 3/12

[52] U.S. Cl. .............. 428/68; 428/116; 428/118; 52/784.14; 52/784.15; 52/793.1

[58] Field of Search .............. 428/68, 116, 118; 52/784.14, 784.15, 793.1

[56] References Cited

U.S. PATENT DOCUMENTS

| | | | |
|---|---|---|---|
| 2,501,180 | 3/1950 | Kunz | 428/116 |
| 2,511,620 | 6/1950 | Clements | 428/72 X |
| 2,602,204 | 7/1952 | Rizza | 428/116 |
| 2,660,766 | 12/1953 | Petterson | 52/784.14 X |
| 2,700,403 | 1/1955 | Herschell | 52/784.14 X |
| 2,769,481 | 11/1956 | Meanor et al. | 428/116 X |
| 2,771,935 | 11/1956 | Clemens | 428/116 X |
| 2,809,403 | 10/1957 | Clements | 52/784.14 X |
| 2,824,630 | 2/1958 | Tolman | 52/784.14 |
| 2,839,442 | 6/1958 | Whitaker | 428/116 X |
| 3,385,002 | 5/1968 | Quinif | 52/784.14 X |
| 4,583,338 | 4/1986 | Sewell et al. | 52/784.14 X |
| 5,167,105 | 12/1992 | Isban et al. | 52/784.15 X |
| 5,670,220 | 9/1997 | Skoien | 428/101 X |
| 5,875,608 | 3/1999 | Quinif | 428/116 X |
| 5,875,609 | 3/1999 | Quinif | 428/116 X |

*Primary Examiner*—Timothy Speer
*Attorney, Agent, or Firm*—Dykema Gossett PLLC

[57] ABSTRACT

A door has an outer skin and an inner skin with a frame along the edges of the outer skin and inner skin to hold the door skins apart to form a hollow space therebetween. A rigid space core filler or spacer is used in the hollow portion to provide structural support between the pair of outer skins. The spacer has a first and second elongated members each oriented perpendicular to the outer skins and a plurality of rigid cross-spacers coupled to an extending between the first elongated member and the second elongated member. The rigid space cores are formed by gluing strips of flexible material between layers of rigid materials so that the rigid materials are held together and separated the length of the flexible material to form a first assembly. The first assembly formed is cut across the layers of material and through the rigid layers. An adhesive is applied to the top edges of this assembly and is placed between a pair of rigid layers to form a second assembly. Once the adhesive is set the second assembly is cut across the first set of rigid material to form the spacer. The spacer is then used for insertion into a hollow space within the door.

16 Claims, 2 Drawing Sheets

CORRUGATED STRUCTURAL PAPER FILLERS FOR THE INTERIOR AREAS OF HOLLOW DOORS AND THE METHOD OF MAKING SAME

BACKGROUND OF THE INVENTION

The present invention relates generally to hollow doors and more specifically to a core structure inserted within a hollow door to provide support for the skins of the door.

Hollow core doors are commonly used in many types of buildings. The common structure of a hollow core door includes a pair of door skins which are separated by a wood frame. The wood frame has vertical wood stiles joined to upper and lower horizontal wood rails. The wood stiles and rails form the edges of the door. A lock block may also be included in the area of the door where locks and handles are attached. The lock block provides the additional support that is needed to secure a lock in the door. A hollow area is enclosed between the two door skins and within the frame. The hollow area typically requires some type of structural reinforcement.

One type of reinforcement commonly used in hollow core doors is a honeycomb core structure that is glued in place between the door skins. The honeycomb core structure may be, for example, corrugated board. The honeycomb structure is supplied in an unexpanded manner. The honeycomb core is stretched across the skin of the interior of the door. One problem with using such a honeycomb core structure is that it is difficult to stretch to achieve an even honeycomb pattern within the door. Commonly, the honeycomb core must be overstretched and then manipulated into place. This process is labor intensive and thus not a cost effective manner for manufacturing the door.

The honeycomb core fully extends between the horizontal rails and vertical stiles to completely fill the hollow interior. Consequently, more core material is inserted within the interior of the door than is actually required for support. The extra core material increases the cost of the door.

Another type of door reinforcement includes solid blocks placed strategically between the door skins. The solid blocks are commonly formed of laminated strips of corrugated or from pieces of styrofoam. One disadvantage of solid block is that they use a large quantity of material making them more expensive. Also, these solid blocks require a significant amount of glue to be spread over their entire surface to bond to the outer skins of the door.

The outer skins of hollow core doors maybe formed using a planar flush panel or they may have a contoured colonial-type molded panel configuration. In a colonial-type panel configuration, a portion of the panel extends within the hollow interior of the door. The thickness of the hollow space in that area is reduced. Inserting a honeycomb structure or core in such a door is undesirable since the honeycomb core would have to be reduced in thickness in the areas where the panel extends within the hollow interior of the door. Although this has been done, because the honeycomb does not stretch evenly, the areas reduced in thickness do not always align where desired.

It is therefore desirable to provide a corrugated structural paper core filler or support for a hollow core door which is cost effective by being easy to manufacture and by using a reduced amount of material.

SUMMARY OF THE INVENTION

It is therefore an object of the invention to provide an improved construction for a hollow core door.

In accordance with one aspect of the invention, a door is provided that has a pair of outer skins separated by a frame to form a hollow interior therebetween. A rigid space core filler, spacer or support is connected between the pair of skins. The spacer has first and second elongated members each oriented perpendicular to the pair of outer skins and a plurality of rigid cross spacers coupled to and extending between the first and second elongated members. Many spacers have different length elongated members that may be suited for placement in various locations within the hollow space within the door to provide structural rigidity only to areas of the hollow space requiring reinforcement.

In this manner, one important advantage of the invention is evident. That is, the structural reinforcing material only has to be provided in areas requiring structural reinforcement rather than throughout the entire door. Such a configuration reduces the amount of material and adhesive and, as a consequence, the cost of manufacturing the door.

In accordance with another aspect of the invention, a method for forming a door comprises coupling pieces of a flexible material between a set of relatively rigid layers and cutting through the rigid layers and flexible material to form strips having a width so that the rigid layers are held together by pieces of the flexible material when the rigid layers are separated. The method further comprises the steps of applying an adhesive to the edges of the rigid layers. The rigid layers are then placed between a pair of rigid layers so that the width of the strips separates the pair of rigid layers. Once the adhesive has set, a rigid space core filler or support is formed by cutting through the pair of rigid layers so that the set of rigid layers provides structural support between the pair of rigid layers.

In forming the door, an adhesive is applied to the edges of the rigid space core filler. The rigid space core filler is placed on the hollow side of an outer skin. The framing of the door may also be connected to the hollow side of an outer skin. The second outer skin is then placed together with the frame and rigid space core fillers to form the door.

It is another advantage of the invention that the rigid space core fillers are easily placed within the hollow core filler of the door thus resulting in relatively less manufacturing time. Single length strips of rigid space core fillers may be formed and can be broken into the desired length by hand without scoring. Manufacturing single length strips decreases inventory of parts at the manufacturing facility.

Yet another advantage of the invention is that a the space core filler of the present invention is that it is strong at the edges and includes pillars of strength provided between the two elongated members. Theses pillars of strength are due to the glue coating the cross members which reinforces them.

A further advantage is that the rigid space core fillers may be placed so as not to interfere with any reduced thickness in a panel-type door.

BRIEF DESCRIPTION OF THE DRAWINGS

Other features and advantages of the present invention will become apparent from the following detailed description which should be read in conjunction with the drawings in which.

DETAILED DESCRIPTION OF THE PREFERRED EMBODIMENTS

Figure 2:
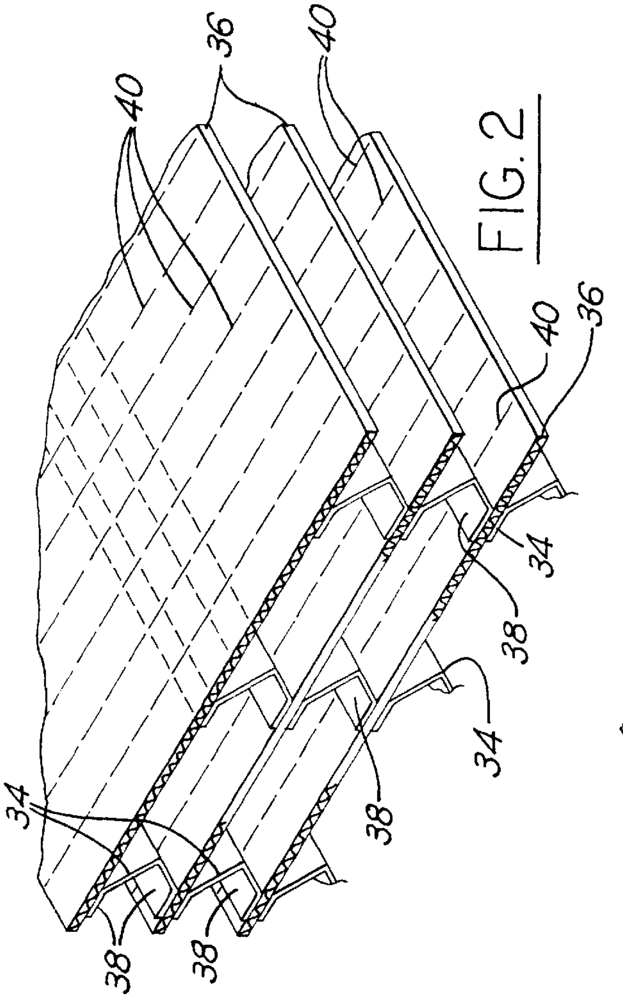
FIG. 2 is a perspective view of a first set of rigid layers coupled by strips of elongated flexible material illustrating an intermediate step of the method for forming a rigid space core filler for a door.

Referring now to the drawings like reference numerals are used to identify identical components in the various views. Although the invention will be illustrated in the context of a hollow core four panel door, it will be appreciated that this invention may be used with other hollow core door applications such as a flush door.

Figure 1:
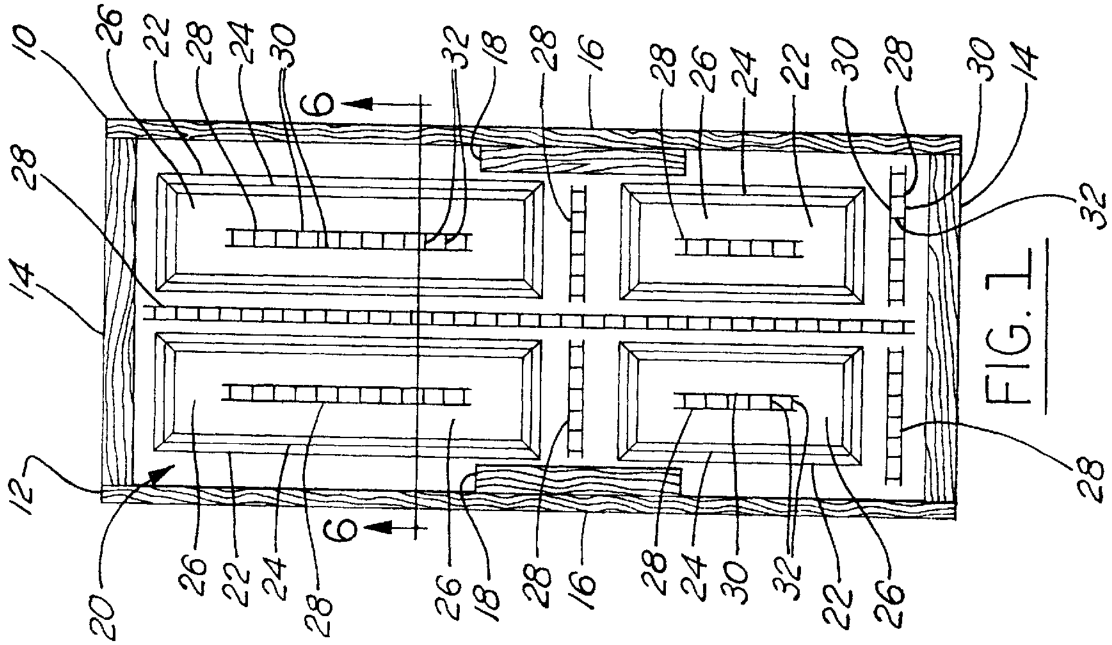
FIG. 1 is a cut-away view of an interior portion of a hollow core door formed according to the present invention.

Referring now to FIG. 1, a hollow core filler door 10 has a frame 12 around its perimeter. Frame 12 comprises horizontal stiles 14 and vertical stiles 16. In the preferred embodiment, horizontal stiles 14 and vertical stiles 16 are formed of solid wood material. A lock block 18 may also be part of the supporting structure of door 10. Lock block 18 is used at the location in which the door handle and locks may be fastened.

Door 10 has a pair of outer skins 20, one of which has been removed to reveal the inner structure of door 10. Outer skins 20 may be planar as in a flush-type door. The outer skin as shown incorporates a number of panels 22. Panels 22 consist of a molded portion 24 and a planar portion 26. It is preferred that planar portion 26 lies on the same plane as the portions of the door between panels 22 and the portions adjacent to frame 12.

To provide structural rigidity and to hold the outer skins 20 apart, a rigid space core fillers 28 is affixed between outer door skins 20. Rigid space core fillers 28 have a pair of elongated members 30 that are preferably perpendicular to the plane of outer skins 20. Rigid space core fillers 28 also have a plurality of cross-members 32 that are preferably perpendicular to the plane of outer skins 20 and perpendicular to elongated members 30. In the preferred embodiment, elongated members 30 and cross-members 32 are a two-face corrugated cardboard material that are adhesively joined together and adhesively joined to outer skins 20.

Referring now to FIG. 2, the first step in forming a rigid space core filler is shown. Strips of an elongated flexible material 34 are adhesively joined to rigid layers 36. Material 34 is preferably folded so that an adhesive region 38 is formed along the length of the lateral edges of flexible material 34. Flexible material 34 may be a thin paper material. It is also preferred that the material 34 is mounted to rigid layers 36 so that material 34 is parallel to the other strips of flexible material 34. The strips of material 34 may be mounted to rigid layers 36 so that adhesive regions 38 are on directly opposite sides of rigid layers 36. Rigid layers 36 will eventually form the cross-members 32 of rigid space core fillers 28 as shown in FIG. 1. Three strips of material 34 is shown in FIG. 2, however, a different number of strips 34 may be used depending on the application. For example, two strips may also be used.

Once the strip material 34 is secured to rigid layers 36, rigid layers 36 are collapsed so that rigid layers 36 are directly adjacent to or very close to adjacent to the other rigid layers 36. Assembly 44 is then cut across the strip material 34. The cut direction is preferably perpendicular to the length of the strips of material 34. The cut lines are shown in FIG. 2 by phantom lines 40.

Figure 3:
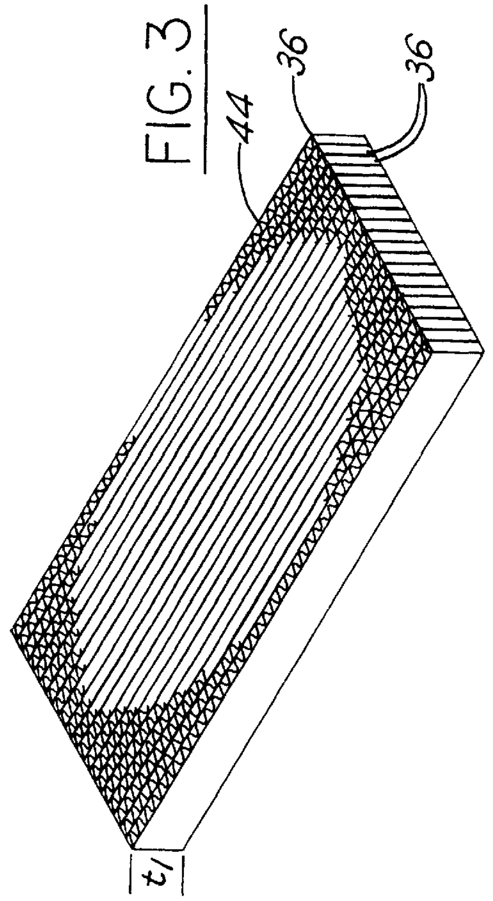
FIG. 3 is a perspective view of strips of the first set of rigid layers after being cut from FIG. 2 illustrating an intermediate step of the method for forming the rigid space core filler for a door.

Referring now to FIG. 3, after assembly 44 of FIG. 2 is formed, a plurality of strips having layers of rigid layers 36 are formed. The rigid layers 36 have strip material 34 therebetween to hold the rigid layers an equal distance apart when stretched. The thickness $t_1$ of rigid layers 36 of FIG. 3 corresponds to the length of cross-members 32 as shown in FIG. 1. While still being collapsed, an adhesive may be applied to each side of the assembly 44. The adhesive may be applied by hand or by using an automated glue spreader that is common in industry.

Figure 4:
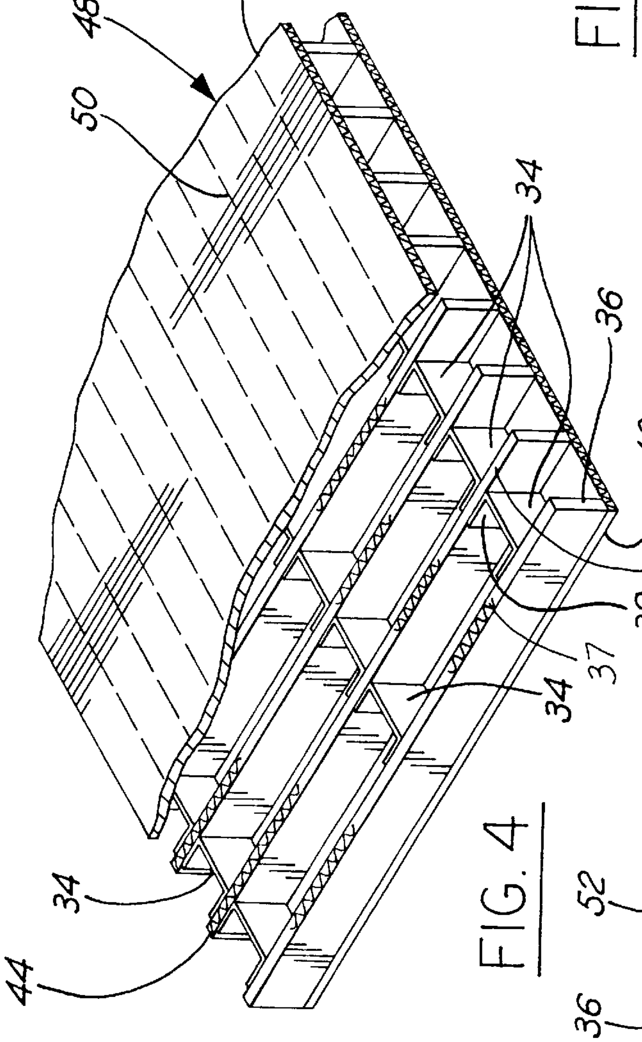
FIG. 4 is the apparatus of FIG. 3 stretched and formed between two additional layers of rigid material illustrating another intermediate step of the manufacture of a rigid space core filler.

Referring now to FIG. 4, assembly 44 is stretched once glue has been applied to the top end edges face 37 of rigid layers 36. Assembly 44 is preferably stretched so that the material 38 is relatively taut, assembly 44 is placed between a pair of rigid layers 46. Rigid layers 46 are held parallel to each other and perpendicular to the rigid layers 36 of assembly 44 by material 34. Rigid layers 46 become the elongated members 30 of FIG. 1.

Once the adhesive that has been applied to the top end edge face 37 of rigid layers 36 has bonded to the pair of rigid layers 46, the resulting assembly 48 is cut into rigid space core fillers shown at FIG. 1 as 28. Assembly 48 is cut along cut lines 50 in a direction across rigid layers 36. The direction of the cut is preferably perpendicular to the length of rigid layers 36. The distance between the cut lines 50 should correspond to the distance between the two skins of the hollow core filler door 10. If a door such as a panel door is an area with reduced thickness, the distance between the cuts can be adjusted accordingly.

Figure 5:
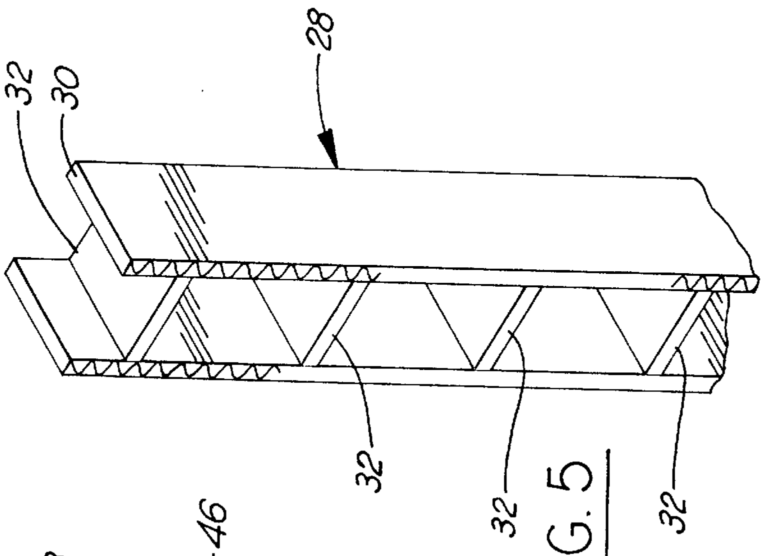
FIG. 5 is a perspective view of a rigid space core filler.

Referring additionally now to FIG. 5, rigid layers 36 become cross-members 32 and rigid layers 46 become elongated members 30 of rigid space core fillers 28, with the full length end faces 37 of the cross members abuttingly coupled to the rigid layers 46. Cross members 32 are preferably spaced to prevent elongated members 30 from being crushed during glue spreading. For example, cross members 32 may be about two inches apart. The length of the corrugated ridges extend between elongated members 30. (This is best seen in the cutaway view of FIG. 4). Glue within the corrugated ridges form pillars of strength extending between the elongated members. Orienting the corrugated ridges in this manner increases strength. The length of rigid space core filler 28 may then be adjusted to fit the desired application. In the preferred embodiment the length may be adjusted by hand without tools. An adhesive is applied to the top edges of elongated members 30 and elongated cross-members 32 before placement into the door 10.

Figure 6:
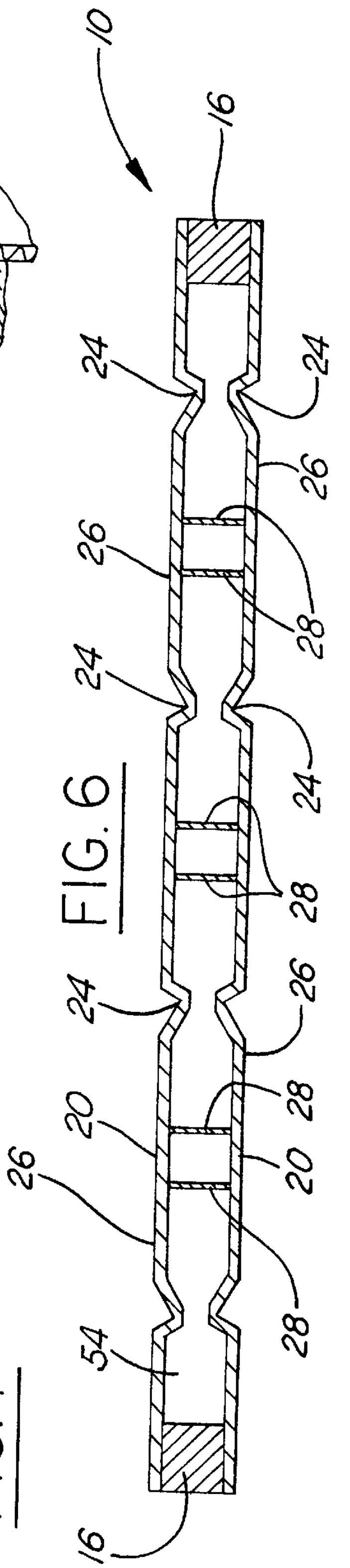
FIG. 6 is a cross-sectional view of a rigid space core filler inserted within the hollow space within a door.

Referring now to FIG. 6, a cross-sectional view of a hollow portion 54 of a door 10 is shown. Typically, one outer skin 20 is placed horizontally. Door frame 12 which includes vertical stiles 16 is placed along the perimeter of outer skin 20 and affixed thereto. Commonly an adhesive is used to affix the door frame 12 to outer skin 20. Rigid space core fillers 28 having adhesive applied thereto are placed in predetermined locations to provide structural rigidity to the door. The other outer skin 20 is then placed and aligned with the opposite outer skin 20 to form the door 10.

Figure 7:
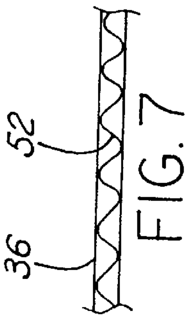
FIG. 7 is a fragmentary side view of a crushed rigid layer.

Referring now to FIG. 7, in a modified embodiment the rigid layers 36 may be crushed prior to affixing them to material 34. Crushing in this instance refers to reducing the thickness of each rigid layer. By crushing each rigid layer 36, the corrugated layer 52 of cardboard is deformed irregularly. The area into which the adhesive may bond is increased so that more adhesive is absorbed into rigid layer 36. By absorbing more adhesive, rigid layer 36 obtains more rigidity.

While the best mode for carrying out the present invention has been described in detail, those familiar with the art to which this invention relates will recognize various alternative designs and embodiments for practicing the invention as defined by the following claims:

What is claimed is:

1. A door comprising:

a first outer skin;

a second outer skin;

a frame separating said first outer skin and said second outer skin to form a hollow space between said frame, said first outer skin and said second outer skin;

said frame having a pair of spaced apart vertical stiles and a pair of spaced apart horizontal stiles;

at least one of said skins having panels formed therein with each panel outlined by a raised molding at the interior surface of said one skin;

a plurality of rigid space core fillers located in said hollow space, between said skins, each of said fillers being made from corrugated paper material, each of said core fillers having a length, a relatively narrow width and a relatively narrow depth compared to its length, each core filler being located in said hollow space and connected to said first outer skin and said second outer skin separated from said molding to form a support for said skins thereby holding said first and second skins a predetermined distance apart as determined by its depth;

each rigid space core filler having a first elongated member and a second elongated member, said first elongated member being generally parallel to and spaced a predetermined distance apart from said second elongated member, said first elongated member and said second elongated member being oriented substantially perpendicular to said first outer skin and said second outer skin and a plurality of rigid cross spacers extending between said first and second elongated members, said rigid cross spacers having full length end faces abuttingly coupled to said first and second elongated members to determine the width of said filler, said rigid cross spacers having a length substantially equivalent to said predetermined distance and spaced apart from each other and oriented generally perpendicular to said first and second elongated members and to said outer skins;

said rigid core fillers occupying a minor portion of the hollow space of the door.

2. The door as recited in claim 1, wherein both of said first outer skin and said second outer skin have panels with planar sections, said planar sections having said rigid space core fillers affixed therein.

3. The door as recited in claim 1, wherein said cross spacers are formed of a two-face corrugated layer having a first thickness.

4. The door as recited in claim 3, wherein said two-face corrugated layer is crushed to reduce its thickness.

5. The door as recited in claim 1, wherein one of said rigid space core fillers is located in said hollow space midway between and parallel to said vertical stiles, said one rigid space core filler having a length extending from near one of said horizontal stiles and terminating near the other of said horizontal stiles.

6. The door as recited in claim 1, wherein a plurality of said rigid space core fillers are located in said hollow space parallel to a pair of said stiles.

7. The door as recited in claim 6, wherein said plurality of core fillers are parallel to said vertical stiles.

8. The door as recited in claim 6, wherein said plurality of core fillers are parallel to said horizontal stiles.

9. The door as recited in claim 6, wherein said plurality of rigid space core fillers include a pair of fillers which are parallel to said horizontal stiles and a pair of fillers which are parallel to said vertical stiles.

10. A door comprising:

a first outer skin;

a second outer skin;

a frame separating said first outer skin and said second outer skin to form a hollow space between said frame, said first outer skin and said second outer skin;

said frame having a pair of spaced apart vertical stiles and a pair of spaced apart horizontal stiles; and a plurality of rigid space core fillers which are spaced apart and located at different locations in said hollow space between said skins and connected to said first outer skin and to said second outer skin thereby holding and supporting said first and second skins a predetermined distance apart;

each of said rigid space core fillers being formed of two-face corrugated material having a length, a relatively narrow width compared to its length and a depth equal to said predetermined distance;

each of said rigid space core fillers having a first elongated member and a second elongated member, said first elongated member being generally parallel to and spaced from said second elongated member, said first elongated member and said second elongated member being oriented substantially perpendicular to said first outer skin and to said second outer skin and a plurality of rigid cross spacers extending between said first and second elongated members, said rigid cross spacers having full length end faces abuttingly coupled to said first and second elongated members, said rigid cross spacers having a length substantially equivalent to said predetermined distance and spaced apart from each other and oriented generally perpendicular to said first and second elongated members and to said outer skins;

said rigid core fillers occupying a minor portion of the hollow space of the door.

11. The door as recited in claim 10, where said first outer skin and said second outer skin have at least one panel with a planar section outlined by a raised molding at the interior surface of the skin, said planar section having one of said rigid space core fillers affixed therein separated from said molding to form a support for said skins.

12. The door as recited in claim 10, wherein one of said rigid space core fillers is located in said hollow space midway between and parallel to said vertical stiles, said one rigid space core filler having a length extending from near one of said horizontal stiles and terminating near the other of said horizontal stiles.

13. The door as recited in claim 10, wherein a plurality of said rigid spacer core fillers are located in said hollow space parallel to a pair of said stiles.

14. The door as recited in claim 10, wherein said plurality of core fillers are parallel to said vertical stiles.

15. The door as recited in claim 10, wherein said plurality of core fillers are parallel to said horizontal stiles.

16. The door as recited in claim 10, wherein said plurality of rigid space core fillers include a pair of fillers which are parallel to said horizontal stiles and a pair of fillers which are parallel to said vertical stiles.

* * * * *